US009991536B2

(12) United States Patent
Liu et al.

(10) Patent No.: US 9,991,536 B2
(45) Date of Patent: Jun. 5, 2018

(54) SELF-SUPPLIED HYDROGEN FUEL CELL SYSTEM AND WORKING METHOD THEREOF

(71) Applicant: Beijing University of Civil Engineering and Architecture, Beijing (CN)

(72) Inventors: Yongfeng Liu, Beijing (CN); Hongbing Chen, Beijing (CN); Jianjun Qin, Beijing (CN); Pucheng Pei, Beijing (CN); Shengzhuo Yao, Beijing (CN)

(73) Assignee: Beijing University of Civil Engineering and Architecture, Beijing (CN)

( * ) Notice: Subject to any disclaimer, the term of this patent is extended or adjusted under 35 U.S.C. 154(b) by 0 days. days.

(21) Appl. No.: 15/365,974

(22) Filed: Dec. 1, 2016

(65) Prior Publication Data

US 2017/0084943 A1    Mar. 23, 2017

Related U.S. Application Data

(63) Continuation of application No. PCT/CN2016/079092, filed on Apr. 12, 2016.

(30) Foreign Application Priority Data

Jul. 2, 2015  (CN) .......................... 2015 1 0383244

(51) Int. Cl.
*H01M 8/0612*  (2016.01)
*H01M 8/06*  (2016.01)
(Continued)

(52) U.S. Cl.
CPC ..... *H01M 8/0618* (2013.01); *H01M 8/04201* (2013.01); *H01M 8/06* (2013.01); *H01M 8/0668* (2013.01); *H01M 8/22* (2013.01)

(58) Field of Classification Search
None
See application file for complete search history.

(56) References Cited

U.S. PATENT DOCUMENTS

| 8,349,288 B2 | 1/2013 | Norbeck et al. |
| 2004/0018134 A1* | 1/2004 | Liu ........................ B01J 8/0407 423/247 |

FOREIGN PATENT DOCUMENTS

| CN | 1471427 A | 1/2004 |
| CN | 101142016 B | 5/2010 |

(Continued)

OTHER PUBLICATIONS

B. Lindström, J.A.J. Karlsson, P. Ekdunge, L. De Verdier, B. Häggendal, J. Dawody, M. Nilsson, L.J. Pettersson, "Diesel fuel reformer for automotive fuel cell applications", International Journal of Hydrogen Energy, vol. 34, Issue 8, May 2009, pp. 3367-3381.*

(Continued)

*Primary Examiner* — Barbara L Gilliam
*Assistant Examiner* — Nathanael T Zemui

(57) ABSTRACT

The Invention discloses a self-supplied hydrogen fuel cell system and a working method thereof, the system comprising a diesel tank, a gas separator, a fuel cell, a low-temperature separation reactor, a high-temperature separation reactor, an auto-thermal reformer, a water tank and a catalytic burner; With the high-temperature separation reactor, the low-temperature separation reactor and the auto-thermal reformer, diesel is cracked into $H_2$ and CO; as the fuel for the fuel cell, $H_2$ may react with $O_2$ in the air and generate electric energy; the unreacted $H_2$ and CO enter into the catalytic burner for combustion, ensuring that the water is heated; thus, it not only provides $H_2$ to the fuel cell, but also provides high-temperature water to the auto-thermal converter to produce $H_2$; electric energy can be generated (Continued)

without burning diesel; since no $NO_x$ or particulate matters but $CO_2$ is generated, the goal of ultra-low emission is achieved.

3 Claims, 1 Drawing Sheet

(51) Int. Cl.
*H01M 8/22* (2006.01)
*H01M 8/04082* (2016.01)
*H01M 8/0668* (2016.01)

(56) References Cited

FOREIGN PATENT DOCUMENTS

| CN | 101771161 A | 7/2010 | | |
|---|---|---|---|---|
| CN | 104466208 A | 3/2015 | | |
| WO | WO 0193355 A2 * | 12/2001 | ............ | B01J 23/462 |

OTHER PUBLICATIONS

Remzi Can Samsun, Christiane Wiethege, Joachim Pasel, Holger Janßen, Werner Lehnert, Ralf Peters, "HT-PEFC systems operating with diesel and kerosene for APU application", Energy Procedia 29 ( 2012 ) 541-551.*

Remzi Can Samsun, Joachim Pasel, Ralf Peters, Detlef Stolten, "Fuel cell systems with reforming of petroleum-based and synthetic-based diesel and kerosene fuels for APU applications", International Journal of Hydrogen Energy, vol. 40, Issue 19, May 25, 2015, pp. 6405-6421.*

Marius Maximini, Philip Engelhardt, Martin Brenner, Frank Beckmann, Oliver Moritz, "Fast start-up of a diesel fuel processor for PEM fuel cells", International Journal of Hydrogen Energy, vol. 39, Issue 31, Oct. 22, 2014, pp. 18154-18163.*

1st Office Action of counterpart Chinese Patent Application No. 201510383244.7 dated Nov. 16, 2016.

* cited by examiner

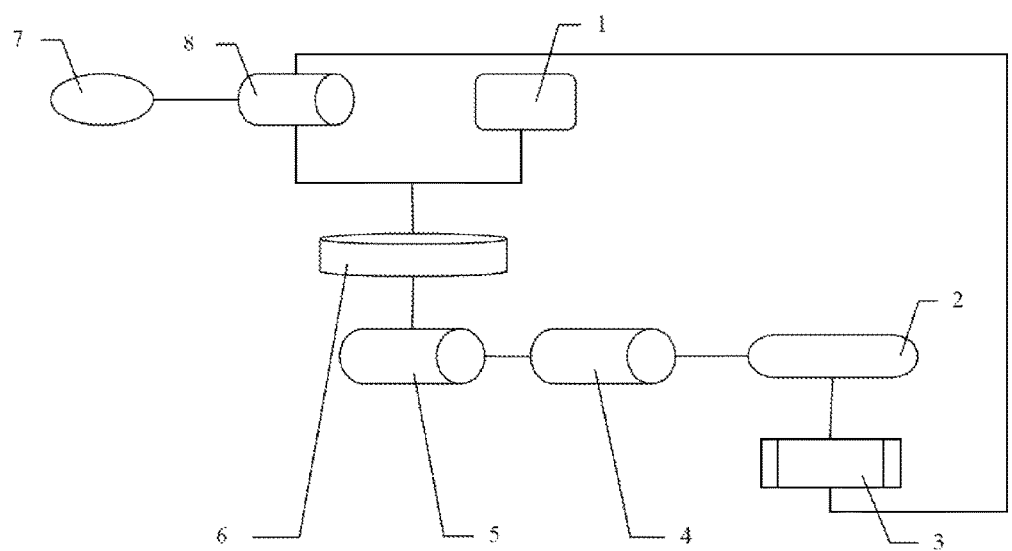

SELF-SUPPLIED HYDROGEN FUEL CELL SYSTEM AND WORKING METHOD THEREOF

CROSS REFERENCE TO RELATED APPLICATIONS

The present application is a Continuation Application of PCT application No. PCT/CN2016/079092 filed on Apr. 12, 2016, which claims the benefits of Chinese Patent Application No. 201510383244.7 filed on Jul. 2, 2015, the contents of which are hereby incorporated by reference.

FIELD OF THE INVENTION

The Invention relates to the field of fuel cell technology and particularly to a self-supplied hydrogen fuel cell system and a working method thereof.

BACKGROUND OF THE INVENTION

As a new energy source for vehicles, fuel cell is becoming a research hotspot, and the related technology of hydrogen supply is also becoming a research emphasis. With the advantages of high efficiency, large energy density, low noise and non-pollution, proton exchange membrane fuel cell is regarded as the next generation of power unit for vehicles which is mostly to replace internal combustion engine. Hydrogen, the fuel for proton exchange membrane fuel cell, does not exist in natural world and can only be transformed from other kinds of energy. However, the active chemical property of hydrogen makes it a problem for hydrogen storage. With the technology of auto-thermal conversion of diesel designed in the Invention, it can not only achieve zero-emission of the fuel cell, but also solve the problem of hydrogen source. Some reference patents (CN101142016B and U.S. Pat. No. 8,349,288) have provided a device and a method for homogeneous conversion of oil and oxygen as well as an approach and a method for auto-thermal conversion of methane, but they have given no overall scheme with fuel cell. With inadequate design for self-supply of hydrogen for fuel cell, the practical applicability needs to be further studied. The Patent conducts systematic study on diesel pyrolysis for generating hydrogen and provides a new overall scheme more feasible for self-supplied hydrogen of diesel. Generating hydrogen through electrolysis of water is only a method applied in a laboratory rather than in a vehicle. The Invention is designed to provide energy to achieve zero emission of fuel cell by achieving self-generated hydrogen for diesel vehicles.

SUMMARY OF THE INVENTION

The purpose of the Invention is to achieve the self-supplied hydrogen described above and meanwhile achieve zero emission of fuel cell, conforming to current situation of the reform for vehicle emission reduction in China.

The Invention provides a self-supplied hydrogen fuel cell system, comprising a diesel tank, a gas separator, a fuel cell, a low-temperature separation reactor, a high-temperature separation reactor, an auto-thermal reformer, a water tank and a catalytic burner;

wherein, the diesel tank and the catalytic burner are respectively connected to the auto-thermal reformer through a pipeline; the catalytic burner is respectively connected to the water tank and the fuel cell; the auto-thermal reformer, the high-temperature separation reactor, the low-temperature separation reactor, the gas separator and the fuel cell are connected in series;

wherein, the outlet pipe of the water tank is connected to the water inlet of the catalytic burner; the steam outlet of the catalytic burner is connected to the oil/steam inlet of the auto-thermal reformer through a pipeline; the oil outlet of the diesel tank is also connected to the oil/steam inlet of the auto-thermal reformer through a pipeline; the mixed gas outlet of the auto-thermal reformer is connected to the gas inlet of the high-temperature separation reactor through a pipeline; the gas outlet of the high-temperature separation reactor is connected to the gas inlet of the low-temperature separation reactor through a pipeline; the gas outlet of the low-temperature separation reactor is connected to the mixed gas inlet of the gas separator through a pipeline; the gas outlet of the gas separator is connected to the fuel inlet of the fuel cell and the exhaust outlet of the fuel cell is connected to the combustor of the catalytic burner.

Further, the gas separator has a housing; an air inlet is arranged on the top of the housing and a separated gas outlet is arranged on the side bottom of the housing.

The Invention also provides a working method for the self-supplied hydrogen fuel cell system. The diesel will have a fission reaction with the heated water in the auto-thermal reformer. Through the high-temperature separation reactor and the low-temperature separation reactor, the fission reaction is conducted adequately. The generated CO and $H_2$ then enter into the gas separator to mix with the air and obtain $O_2$ and $H_2$ with suitable temperature. As the negative and positive poles of the fuel cell, they could generate electric energy. The excessive $H_2$ and the aforesaid generated CO enter into the catalytic burner for combustion and generate water and $CO_2$ to be discharged into the air.

Preferably, the water is pre-heated before entering into the catalytic burner.

The Invention is to make diesel have adequate fission reaction with hot water steam and $O_2$ to generate CO and $H_2$; wherein, $H_2$, the fuel needed in the fuel cell, can generate electric energy with $O_2$ in the air in the fuel cell. CO enters into the catalytic burner for combustion and generates $CO_2$ to be discharged into the air, and thus achieves the goal of ultra-low emission.

With the Invention, the ultra-low emission of diesel engine is achieved, the work capacity is enhanced and the generation of $NO_x$ and particulate matters is avoided. No pollutants but water will be generated after the reaction of fuel cell, thus, it solves the problem of power supply for diesel vehicle and also achieves the ultra-low emission of diesel engine.

BRIEF DESCRIPTION OF THE DRAWING

The FIGURE is a system diagram of the overall plan of the Invention;

Marks in the FIGURE: 1—diesel tank; 2—gas separator; 3—fuel cell; 4—low-temperature separation reactor; 5—high-temperature separation reactor; 6—auto-thermal reformer; 7—water tank and 8—catalytic burner.

DETAILED DESCRIPTION OF THE INVENTION

The Invention is further described in combination with the FIGURE as follows:

With reference to the FIGURE, the self-supplied hydrogen fuel cell system of the Invention comprises a diesel tank 1, a gas separator 2, a fuel cell 3, a low-temperature separation reactor 4, a high-temperature separation reactor 5, an auto-thermal reformer 6, a water tank 7 and a catalytic burner 8;

wherein, the diesel tank 1 and the catalytic burner 8 are respectively connected to the auto-thermal reformer 6 through a pipeline; the catalytic burner 8 is respectively connected to the water tank 7 and the fuel cell 3; the auto-thermal reformer 6, the high-temperature separation reactor 5, the low-temperature separation reactor 4, the gas separator 2 and the fuel cell 3 are connected in series;

wherein, the outlet pipe of the water tank 7 is connected to the water inlet of the catalytic burner 8; the steam outlet of the catalytic burner 8 is connected to the oil/steam inlet of the auto-thermal reformer 6 through a pipeline; the oil outlet of the diesel tank 1 is also connected to the oil/steam inlet of the auto-thermal reformer 6 through a pipeline; the mixed gas outlet of the auto-thermal reformer 6 is connected to the gas inlet of the high-temperature separation reactor 5 through a pipeline; the gas outlet of the high-temperature separation reactor 5 is connected to the gas inlet of the low-temperature separation reactor 4 through a pipeline; the gas outlet of the low-temperature separation reactor 4 is connected to the mixed gas inlet of the gas separator 2 through a pipeline; the gas outlet of the gas separator 2 is connected to the fuel inlet of the fuel cell 3 and the exhaust outlet of the fuel cell 3 is connected to the combustor of the catalytic burner 8.

The gas separator 2 of the Invention has a housing; an air inlet is arranged on the top of the housing and a separated gas outlet is arranged on the side bottom of the housing; a flow control device, such as flow valve, is arranged at the gas outlet of the gas separator 2 to regulate the gas supply for the fuel cell 3.

The working method based on the aforesaid fuel cell system is that: water enters into the catalytic burner 8 from the water tank 7 for being heated to 100° C. and enters into the auto-thermal reformer 6 in the form of steam; diesel enters into the auto-thermal reformer 6 from the diesel tank 1 and has a fission reaction with the steam and $O_2$ in the air in the auto-thermal reformer 6; through the high-temperature separation reactor 5 and the low-temperature separation reactor 4, CO and $H_2$ with the temperature of 180° C. will come out from the low-temperature separation reactor 4 after adequate fission reaction and enter into the gas separator 2 to mix with the air and heat the $O_2$ in the air; then the temperature of $H_2$ and $O_2$ is about 150° C., just meeting the requirements of the electrode of the high-temperature fuel cell; $H_2$ and $O_2$ enter into the fuel cell 3 for electrochemical reaction to generate electric energy for diesel vehicles; the unreacted $H_2$ and CO enter into the catalytic burner 8 for combustion and generate water and $CO_2$ to be discharged into the air. Thus, diesel vehicle achieves the goal of ultra-low emission without burning diesel.

It shall be noted that, the water can be pre-heated to a suitable temperature before entering into the catalytic burner 8 from the water tank 7, so as to accelerate the vaporization process in the catalytic burner 8.

The fuel cell of the system in the Invention can be used on the diesel vehicles which use electricity frequently such as refrigerator car and mixer truck, etc. Meanwhile, the electricity generated by the fuel cell also can be used on other vehicle-mounted electrical equipment for refrigerating in driving cab, seat heating and audio supplies, etc.

The Invention is not limited to the description of above embodiments. Any improvement and amendment made by a person skilled in the art without any creative work according to the content of the Invention, such as the selection and setting-up of the auto-thermal reformer and the catalytic burner, shall fall within the protection scope of the Invention.

What is claimed is:

1. A working method for a self-supplied hydrogen fuel cell system, the self-supplied hydrogen fuel cell system comprising a diesel tank (1), a gas separator (2), a fuel cell (3), a low-temperature separation reactor (4), a high-temperature separation reactor (5), an auto-thermal reformer (6), a water tank (7) and a catalytic burner (8) having a combustor;

wherein, the diesel tank (1) is connected to the auto-thermal reformer (6) through a pipeline; the catalytic burner (8) only comprises a first port being a steam outlet, a second port being a water inlet and a third port being a combustor port, the first port being connected to the auto-thermal reformer (6) only through a first pipeline, the second port being connected to the water tank (7) only through a second pipeline, and the third port being connected to the fuel cell (3) only through a third pipeline; the auto-thermal reformer (6), the high-temperature separation reactor (5), the low-temperature separation reactor (4), the gas separator (2) and the fuel cell (3) are connected in series;

an outlet pipe of the water tank (7) is connected to the water inlet of the catalytic burner (8); the auto-thermal reformer (6) only comprises an oil/steam inlet and a mixed gas outlet the steam outlet of the catalytic burner (8) is connected to the oil/steam inlet of the auto-thermal reformer (6) through a pipeline and only provides steam to the auto-thermal reformer (6); an oil outlet of the diesel tank (1) is also connected to the oil/steam inlet of the auto-thermal reformer (6) through a pipeline and only provides diesel to the auto-thermal reformer (6); the mixed gas outlet of the auto-thermal reformer (6) is connected to a gas inlet of the high-temperature separation reactor (5) through a pipeline; a gas outlet of the high-temperature separation reactor (5) is connected to a gas inlet of the low-temperature separation reactor (4) through a pipeline; a gas outlet of the low-temperature separation reactor (4) is connected to a mixed gas inlet of the gas separator (2) through a pipeline; a gas outlet of the gas separator (2) is connected to a fuel inlet of the fuel cell (3) and an exhaust outlet of the fuel cell (3) is connected to the combustor port of the catalytic burner (8);

the method comprising the steps of:

entering water into the catalytic burner (8) from the water tank (7);

heating, by the catalytic burner (8), the water to 100° C. to produce the steam;

only entering the steam into the auto-thermal reformer (6) through the catalytic burner (8) and simultaneously entering the diesel into the auto-thermal reformer (6) through the diesel tank (1);

making the diesel have a fission reaction with the steam and $O_2$ in the air in the auto-thermal reformer (6) and have adequate fission reaction through the high-temperature separation reactor (5) and the low-temperature separation reactor (4) to generate the CO and $H_2$ with a temperature of 180° C.;

entering the generated CO and $H_2$ to the gas separator (2) to mix with air in the gas separator (2) and heating the $O_2$ in the air; and outputting $H_2$ and $O_2$ with a temperature of 150° C. from the gas separator (2) into the fuel cell (43) for electrochemical reaction to generate electric energy; and entering the unreacted $H_2$ and CO into the catalytic burner (8) for combustion and generating water and $CO_2$ to be discharged.

2. The working method according to claim 1, wherein, the water is pre-heated before entering into the catalytic burner (8) from the water tank (7).

3. The working method according to claim 1, wherein, the gas separator (2) has a housing; an air inlet is arranged on the top of the housing and a separated gas outlet is arranged on the side bottom of the housing.

* * * * *